Patented Nov. 1, 1927.

1,647,184

UNITED STATES PATENT OFFICE.

STEPHEN G. LUTHER, OF AKRON, OHIO.

RUBBER PRODUCT AND METHOD FOR PRODUCING THE SAME.

No Drawing.　　Application filed February 19, 1927.　Serial No. 169,681.

This invention relates to rubber products and to methods for vulcanizing the same.

In general the invention is directed to the use in rubber mixes of an improved accelerator which is very inexpensive, yet has effective accelerating and other qualities such as ease of dispersion in a rubber mix, fluxing action therein, production of smooth, easily worked compounds, and producing rubber products easily separable from the molds in which they are cured.

Heretofore, it has been found that caustics in various forms, including caustic soaps, are excellent accelerators of vulcanization. These, however, are soluble and are instable in the rubber mix, making them difficult to handle, producing "nervy" stocks, and, in general, unsatisfactory for commercial use. Insoluble soaps, such as soaps of zinc, magnesium, etc., are stable in the rubber mix and are easily handled, and the stocks are smooth and easily worked, but these have low accelerating value.

The present invention is directed to the use of soaps as accelerators in forms which are not open to the objections of either the caustic soaps or the insoluble soaps and which, it has been discovered, obtain in a rubber mix the advantageous qualities of both without the disadvantages of either. These forms provide accelerators which, while not having the high activity of ultra-accelerators, are capable of producing results comparable therewith as to accelerating value when used in somewhat larger quantities and at much less expense.

The process contemplated by the present invention consists in incorporating in the usual rubber mix containing various vulcanizing ingredients or other accelerators, depending upon the goods being produced, a small quantity of a compound or mixture of soluble and insoluble soaps. These soaps may be manufactured from any of the saponifiable oils, tars, resins, etc., by treatment of an excess thereof with suitable compounds of those metals such as zinc, manganese, magnesium, etc., which produce insoluble soaps and by further treatment thereof with caustics such as sodium or potassium hydrates which produce soluble soaps.

For example, the improved accelerator may be manufactured in accordance with the following formula:—200 parts of heavy hardwood tar, 50 parts of ZnO, 50 parts of liquid caustic (46%). Other compounds producing insoluble soaps with saponifiable substances may be used in place of ZnO and other soluble soap producing reagents than set forth may be used in place of liquid caustic. Of course other saponifiable substances than hardwood tars, e. g., palm oil, pine tar, etc., may be employed.

The proportions of the soluble and insoluble soaps producing reagents can, of course, be varied, depending upon the types of stocks it is desired to produce, small proportions of insoluble soaps serving to stabilize large proportions of soluble soaps and small proportions of soluble soaps serving to increase the accelerating power of large proportions of the insoluble soaps.

The above accelerator has been found to greatly improve the tensile strength of vulcanized rubber stocks in which it has been incorporated as well as to accelerate the vulcanization thereof. For example, a rubber mix using the new accelerator in the proportions set forth below has after a forty-five minute cure under forty pounds of steam a tensile strength of 971, elongation of 382 and set of 17 as compared with the same compound using an expensive ultra accelerator, which has a tensile of 1013, elongation of 276 and set of 11. The particular formulæ used were:—

With compound soap accelerator—10 parts smoked sheets, 60 parts reclaimed rubber, 26 parts zinc oxide, 3 parts sulphur, 1 part accelerator.

With ultra-accelerator—10 parts smoked sheets, 60 parts reclaimed rubber, 26¾ parts zinc oxide, 3 parts sulphur, ¼ part accelerator.

It appears from the foregoing example that the accelerator of the present invention, when used in larger quantities than ultra-accelerators, produces quite similar results and since its expense of production is very small as compared with the ultra-accelerators and, furthermore, since it has desirable fluxing, dispersing and non-scorching qualities and produces smooth products easily separable from their forming molds, properties not found to a great extent in ultra-accelerators, it has a large field of usefulness in various types of stocks either alone or in combination with ultra-accelerators, in the latter case enabling replacement of a proportion of the ultra-accelerator with the cheaper soap accelerator.

It is to be understood that the invention is not limited to the specific examples set forth herein for illustrative purposes and that modifications of the invention may be resorted to without departing from the spirit thereof or the scope of the appended claims.

What is claimed is:

1. That process of vulcanizing rubber which comprises incorporating a compound of soluble and insoluble soaps in the rubber mix and vulcanizing the same under heat and pressure.

2. That process of vulcanizing rubber which comprises incorporating a compound of caustic and zinc soaps in the rubber mix and vulcanizing the same under heat and pressure.

3. That process of vulcanizing rubber which comprises incorporating a compound including soluble and insoluble soaps in the rubber mix and vulcanizing the same.

4. A vulcanized rubber product having included therein a compound of soluble and insoluble soaps.

5. A vulcanized rubber product having included therein a compound of caustic and insoluble soaps.

6. A vulcanized rubber product having included therein a compound of caustic and zinc soaps.

7. That process of vulcanizing rubber which comprises incorporating in the rubber mix soluble and insoluble soaps and an ultra-accelerator, and vulcanizing the same.

8. A vulcanized rubber product having included therein soluble and insoluble soaps and an ultra-accelerator.

STEPHEN G. LUTHER.